United States Patent [19]

Takeuchi

[11] Patent Number: 4,963,722

[45] Date of Patent: Oct. 16, 1990

[54] METHOD OF STORING A CONSUMED AMOUNT IN A CARD MEMORY

[75] Inventor: Satoshi Takeuchi, Tokyo, Japan

[73] Assignee: Dai Nippon Insatsu Kabushiki Kaisha, Japan

[21] Appl. No.: 284,820

[22] Filed: Dec. 14, 1988

Related U.S. Application Data

[63] Continuation of Ser. No. 865,013, May 20, 1986, abandoned.

[30] Foreign Application Priority Data

May 20, 1985 [JP] Japan .................. 60-107929

[51] Int. Cl.⁵ .................. G06K 1/12; G06K 19/08
[52] U.S. Cl. .................. 235/382.5; 235/487; 235/381; 369/14
[58] Field of Search ............ 235/375, 376, 377, 378, 235/380, 381, 382, 494, 493, 487, 492, 440, 449, 382.5, 384; 369/14; 360/2; 283/23, 26, 28, 29, 30, 100, 105, 904

[56] References Cited

U.S. PATENT DOCUMENTS

| | | | |
|---|---|---|---|
| 3,501,622 | 3/1970 | Weir et al. | 235/384 |
| 4,204,113 | 5/1980 | Giraud et al. | 235/380 |
| 4,271,351 | 6/1981 | Bloodworth | 235/493 |
| 4,329,576 | 5/1982 | Vander Meer et al. | 235/494 |
| 4,361,757 | 11/1982 | Ehrat | 235/380 |
| 4,370,550 | 1/1983 | Sidline | 235/375 |
| 4,458,142 | 7/1984 | Bernstein | 235/375 |
| 4,524,267 | 6/1985 | Nishimura et al. | 235/379 |
| 4,603,249 | 7/1986 | Hoppe et al. | 235/492 |
| 4,620,727 | 11/1986 | Stockburger et al. | 235/380 |

FOREIGN PATENT DOCUMENTS

| | | | |
|---|---|---|---|
| 60-175192 | 9/1985 | Japan | 235/380 |
| 60-254371 | 12/1985 | Japan | 235/380 |

*Primary Examiner*—Stuart S. Levy
*Assistant Examiner*—Robert A. Weinhardt
*Attorney, Agent, or Firm*—Arnold, White & Durkee

[57] ABSTRACT

A new data recording method is provided in which a consumed amount of predetermined value is recorded in a card memory. Two recording areas are provided in a card memory. The first recording area consists of a plurality of record bits (a through j) which are unchangeable when marked. The second recording area consists of a changeable memory (M). Upper digits of the consumed amount are recorded in the first recording area so as to improve the factor of safety and lower digits of the consumed amount are recorded in the second recording area so as to improve the factor of freedom.

2 Claims, 1 Drawing Sheet

| a | b | c | d | e | f | g | h | i | j |
|---|---|---|---|---|---|---|---|---|---|
| X | X | Y | Y | Y | Y | Y | Z |   |   |

M

|   | a | b | c | d | e | f | g | h | i | j |
|---|---|---|---|---|---|---|---|---|---|---|
|   | X | X | X |   |   |   |   |   |   |   |

PRIOR ART
FIG. 1

|   | a | b | c | d | e | f | g | h | i | j |
|---|---|---|---|---|---|---|---|---|---|---|
|   | X | X | Y | Y | Y | Y | Y | Z |   |   |

METHOD OF STORING A CONSUMED AMOUNT IN A CARD MEMORY

This is a continuation application Ser. No. 06/865,013 filed May 20, 1986, now abandoned.

BACKGROUND OF THE INVENTION

This invention relates to a data recording method in a card memory and, more particularly, to a method of storing a consumed amount of a predetermined value in a cardboard type memory device.

A card memory is widely used for recording telephone charges, carfares, number of copying times with a copying machine, etc. It is very convenient for customers to use such kinds of card memories instead of cash. When a customer makes a payment with a card memory, the consumed amount of value corresponding to the payment is recorded in the card memory. Thus when the total of the consumed amount reaches a predetermined maximum value, the card memory is handled as a spent-out one. In a case of a telephone card, for example, a number of calls is recorded in the card every time the customer makes a phone call. When the recorded number reaches a predetermined maximum number, the telephone card becomes a spent-out one. There are two kinds of memories applicable to a recording area of a memory card. The one is a changeable memory like a memory with magnetic material, and the other is an unchangeable permanent memory such as a fuse-type semiconductor memory, a laser fused memory, and a destroyed hologram memory.

When a changeable memory is applied to the card memory, the factor of freedom increases so that recording of any values in the card memory and changing of the recorded values can be made freely. However the factor of safety decreases so that there is some possibility of accidentally losing a recorded data and allowing a criminal to tamper with a recorded value. Therefore it is dangerous to record a lot of money on the card having a changeable memory.

On the other hand, when an unchangeable memory is applied to the card memory, the factor of safety increases because permanent records are formed on the face of the card. However the factor of freedom decreases because a value which can be recorded is restricted. For example, in a telephone card which is available for 10 telephone calls, 10 record bits of a through j are provided on the card as is shown in FIG. 1, which are marked one by one whenever one telephone call is made. When three telephone calls have been made, bits a, b, c are marked with marks X by some way as shown in FIG. 1. The data recording method described above is suitable for recording a number of telephone calls, train rides over a particular distance, copying times, etc. But the above described method is not suitable for recording purchase amounts for various goods with different prices or transportation fare for various distances. For example, in the telephone card shown in FIG. 1, one record bit corresponds to one telephone call or 10 Yens (Japanese currency), but the same data recording method cannot be applied to a purchase card which has to handle fractions of 10 Yens. In such a purchase card, it is possible to define one record bit as a unit Yens. However, in that case, 10,000 record bits are required when the maximum value of the card is set to 10,000 Yens. This number of bits is not reasonable.

As described above, the data recording method according to the prior art cannot simultaneously improve both the factors of safety and freedom so that method is not suitable for a card which requires both factors.

SUMMARY OF THE INVENTION

An object of this invention is to provide a novel data recording method in a card memory which simultaneously improves both factors of safety and freedom.

The foregoing object is accomplished by providing a first recording area consisting of unchangeable memories and a second recording area consisting of changeable memories in a card memory, and by recording upper digits of the value to be stored in the first recording area so as to improve the factor of safety and recording lower digits of the value in the second recording area so as to improve the factor of freedom.

BRIEF DESCRIPTION OF THE DRAWINGS

In the accompanying drawings:

FIG. 1 illustrates a recording area in a card memory which is recorded by the method according to the prior art; and FIG. 2 illustrates a recording area in a card memory which is recorded by the method according to this invention.

DETAILED DESCRIPTION OF THE PREFERRED EMBODIMENT

In FIG. 2, the first recording area is made up of 10 record bits a through j which are unchangeable when marked, and the second recording area is made up of a changeable memory M. Suppose that the memory card having these two recording areas is used as a purchase card with which a customer can purchase goods of up to 1,000 Yens in total price, and that each record bit corresponds to 100 Yens. When the customer has purchased a 257 Yens goods, the quotient 2 and the remainder 57 are obtained by a division 257/100, where 257 corresponds to a price of the goods and 100 corresponds to the amount assigned to each record bit. Corresponding to the quotient 2, two record bits a and b are marked with marks X's in FIG. 2, for example, which are unchangeable, and corresponding to the remainder 57, the digits 57 are recorded in the memory M. After that, when the customer has further purchased a 565 Yens goods, the quotient 5 and the remainder 65 are obtained by a division 565/100. Then five record bits c, d, e, f, g are marked with marks Y's, for example, corresponding to the quotient 5. The remainder 65 is added to the value 57 recorded in the memory M, and the sum 122 is obtained. Since the sum 122 is over 100, another record bit h is marked with a mark Z, for example, and the fragment 22 which is obtained by a subtraction $122-100$ is recorded in the memory M. That is, the contents of the memory M is changed from 57 to 22. Thus digits in the third place, that is, digits in an order of hundred are recorded with an unchangeble manner in the first recording area so that the safety record is provided, and fragment digits located in the first and second places are recorded with a changeable manner in the second recording area so that the freedom of record is provided and the fragment digits are kept precisely.

In this embodiment, the last record bit j is a special bit to show that the memory card has been spent-out. Therefore the ordinary record bits to record quotients of consumed amount are nine bits of a through i. As described above, after the purchase of the 257 Yens goods and the 565 Yens goods (the total purchase amount is 822 Yens), the record bits a through h have been marked and the fragment 22 has been recorded in the memory M. In this condition, if the customer further tries to spend 250 Yens with the memory card, it will be recognized that the card will be overdrawn because there is only one ordinary record bit, that is record bit i, not marked. Whenever the last ordinary bit i is to be marked, the contents of the memory M are always checked in order to precisely recognize an overflow. For example, in the above described condition, if the customer further tries to spend 190 Yens with the memory card, the following check will be made. The quotient 1 and the remainder 90 are obtained by the division 190/100, and the last ordinary bit i is to be marked corresponding to the quotient 1. Then the remainder 90 is added to the value 22 recorded in the memory M, and whether the sum is over 100 or not is checked. Since the sum 112 is over 100 in this example, it is recognized as overdrawn. On the contrary, if the customer tries to spend 178 Yens in the above described condition, the remainder 78 is added to the value 22 recorded in the memory M. As the sum is just 100, it is recognized that the memory card has just been spent-out, and the special record bit j is marked.

Though a remainder of division is recorded in the memory M in the above recording method, another value which relates to a remainder can be recorded in the memory M. For example, a difference (100-remainder) is recorded instead of a remainder itself. In this recording method, if the customer has purchased a 257 Yens goods, the difference 43 obtained by the subtraction 100−57 is recorded in the memory M. After that, if the customer has purchased a 565 Yens goods, for example, the remainder obtained by the division 565/100 is subtracted from the value 43 recorded in the memory M. Checking the sign of the difference obtained by the above subtraction, the negative sign would be recognized in this example. Therefore the record bit h is marked, and the negative difference is added to 100 so that the value 78 (43−65+100=78) is recorded in the memory M.

Whenever the last ordinary bit i is to be marked, remainder is greater than the value recorded in the memory M, that card is recognized as overdrawn, and when a remainder equals the recorded value, it is recognized that the memory card has just been spent-out, and the special record bit j is marked.

The special record bit j is not always necessary in this invention. It is possible to recognize whether the card has spent-out or not by checking the condition of the 9 ordinary record bits a through i and the value recorded in the memory M.

When the payment exceeds the maximum value allotted to the purchase card, the customer can make a payment by cash for the shortage, or by another purchase card. An issuer can predetermine the maximum value of the purchase card such as 500 Yens, 1,000 Yens, 10,000 Yens, etc. The maximum value can be safely recorded in the purchase card by printing the value on the card or by forming holes through the card. In the above embodiment, a precharged purchase card has been shown as an example, in which a customer has to pay money beforehand. It may be considered that the invention can also be applied to a credit card with which the customer pays money afterwards, a memory card in which manufacturing records for goods or bonus records for customers' purchases are recorded, and a score card in which game scores are recorded.

Though one record bit corresponds to 100 Yens in the above embodiment, it is understood that a record bit may correspond to any natural number N, where the number N becomes a divisor in the division described above.

The following materials can be used for the changeable memory area of this invention; magnetic materials, opto-magnetic materials, heat reversible materials, or changeable semiconductor memories, etc. On the other hand, to the unchangeable memory area of this invention, the following materials can be applied; fuse-typed memories, semiconductor device destroying memories, EPROM's (with a shield mask against ultraviolet light), or EEPROM's (with an electrical lock against erasure). Physical recording methods may also be applied to the unchangeable memory area, such as a method of making a physical hole on a card, a method of printing a physical mark on a card, a method of irradiating a laser beam forming marked pits on the surface of thin metal layer having a low melting point, and a method of recording data on a hologram. Both recording areas can be located on the same area of a card (this allotment is suitable for a semiconductor memory), or separately (this allotment is suitable for a magnetic memory). These recording areas are preferably to be located in consideration of the convenience in writing and reading data.

As has been described above, according to this invention, upper digits of a value to be stored are recorded in the first recording area in a card memory made up of unchangeable memories, and lower digits of the value are recorded in the second recording area made up of changeable memories, so as to simultaneously improve both the factors of safety and freedom.

What is claimed is:

1. A data recording method in a card memory in which a consumed amount up to a predetermined natural number P is recorded, which comprises the steps of:

setting a predetermined natural number N so that said value P is exactly divisible by N and obtaining a quotient Q through a division of P/N;

providing a first recording area on said card memory having an adequate number of record bits (a through j) equal to the obtained quotient Q which are unchangeable when marked so as to provide high security;

providing a second recording area on said card memory having changeable memory means (M) and recording an initial value in said second recording area;

dividing said consumed amount by said natural number N so as to obtain a quotient q and a remainder;

recording said quotient q in said first recording area unchangeable by marking up to the same number of record bits as said quotient q;

reproducing a value recorded in said second recording area;

adding said remainder to said reproduced value so as to obtain a sum S; and recording said sum S in said second recording area as a new value when S is less than N, and when S is at least as great as N, recording the difference S−N in said second recording area as a new value and marking one more record bit in said first recording area.

2. A data recording method in a card memory in which a consumed amount up to a predetermined natural number value P is recorded, which comprises the steps of:

setting a predetermined natural number N so that said value P is exactly divisible by N;

providing a first recording area on said card memory having an adequate number of record bits (A-J) which are unchangeable when marked so as to provide high security;

providing a second recording area on said card memory having changeable memory means (M) and recording an initial value in said second recording area;

dividing said consumed amount by said number N so as to obtain a quotient q and a remainder;

recording said quotient q in said first recording area unchangeable by marking up to the same number of record bits as said quotient q;

reproducing a value recorded in said second recording area;

subtracting said remainder from said reproduced value so as to obtain a difference T; and recording said difference T in said second recording area as a new value when T is positive, and when T is negative or 0, recording the sum T+N in said second recording area as a new value and marking one more record bit in said first recording area.

* * * * *